US012625087B2

(12) United States Patent
Radu et al.

(10) Patent No.: US 12,625,087 B2
(45) Date of Patent: May 12, 2026

(54) PROCESS OF DETERMINATION OF A PERCENTAGE OF GLASS SURFACE TO TREAT AND ASSOCIATED MOBILE APPLICATION

(71) Applicants:AGC GLASS EUROPE, Louvain-la-Neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

(72) Inventors: Xavier Radu, Gosselies (BE); Michael Bruscaglia, Gosselies (BE)

(73) Assignees: AGC GLASS EUROPE, Louvain-la-Neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 354 days.

(21) Appl. No.: 18/248,959

(22) PCT Filed: Oct. 15, 2021

(86) PCT No.: PCT/EP2021/078577
§ 371 (c)(1),
(2) Date: Apr. 13, 2023

(87) PCT Pub. No.: WO2022/079225
PCT Pub. Date: Apr. 21, 2022

(65) Prior Publication Data
US 2023/0384240 A1 Nov. 30, 2023

(30) Foreign Application Priority Data
Oct. 16, 2020 (EP) .................................... 20202380

(51) Int. Cl.
*G01N 22/00* (2006.01)
*H04B 17/30* (2015.01)

(52) U.S. Cl.
CPC ............. *G01N 22/00* (2013.01); *H04B 17/30* (2015.01)

(58) Field of Classification Search
CPC .......... G01N 22/00; H04B 17/30; H04B 3/46; H04B 17/318; C03C 2218/365; C03C 17/3681; E06B 3/6715
See application file for complete search history.

(56) References Cited

U.S. PATENT DOCUMENTS

| | | |
|---|---|---|
| 8,927,069 B1 | 1/2015 | Estinto et al. |
| 2015/0093466 A1 | 4/2015 | Estinto et al. |

(Continued)

FOREIGN PATENT DOCUMENTS

WO WO 2019/191485 A1 10/2019

OTHER PUBLICATIONS

International Search Report Issued Feb. 3, 2022, in PCT/EP2021/078577, filed on Oct. 15, 2021, 3 pages.

(Continued)

*Primary Examiner* — Vladimir Magloire
*Assistant Examiner* — Peter Davon Doze
(74) *Attorney, Agent, or Firm* — Oblon, McClelland, Maier & Neustadt, L.L.P.

(57) ABSTRACT

A process of determination of a percentage of glass surface to treat with a decoating process in a defined enclosed space in order to reach a predetermined level of electromagnetic reception and/or transmission at a predetermined frequency, using a database. The process contains the following: measurement of the inside and/or outside electromagnetic signal amplitude; calculation of an expected attenuation level; identification, in said database, of reference percentages of (Continued)

treated surface where the corresponding reference attenuation levels are inferior or equal to the expected attenuation level; determination of a percentage of glass surface to treat in the defined enclosed space corresponding to the identified reference percentage of treated surface where the corresponding reference attenuation level is minimum.

16 Claims, 7 Drawing Sheets

(56)                    References Cited

U.S. PATENT DOCUMENTS

| | | |
|---|---|---|
| 2015/0093554 A1 | 4/2015 | Estinto et al. |
| 2018/0036839 A1* | 2/2018 | Estinto .................. C03C 17/366 |
| 2021/0032926 A1 | 2/2021 | Bertin-Mourot et al. |
| 2021/0101369 A1* | 4/2021 | Lambricht ........ B32B 17/10119 |

OTHER PUBLICATIONS

Bouvard Olivia et al: "Mobile communication through insulating windows: a new type of low emissivity coating", Energy Procedia, Elsevier, NL, vol. 122, Sep. 11, 2017 (Sep. 11, 2017), pp. 781-786, XP085187919, ISSN: 1876-6102, DOI: 10.1016/J.EGYPRO.2017. 07.396, 6 pages.

* cited by examiner

Ta, La, Fo

| Ds_ref | T_ref [dB] |
|---|---|
| 0 | 30 |
| 10% | 14 |
| 15% | 11 |
| 20% | 10 |
| 25% | 8,87 |
| 30% | 8 |
| 35% | 7 |
| 40% | 6,85 |
| 45% | 6,35 |
| 50% | 5,89 |

| O_id | Tg_ref | Ds_ref | T_ref [dB] |
|---|---|---|---|
| | dV | 0 | 32 |
| | dV | 10% | 16 |
| | dV | 15% | 13 |
| | dV | 20% | 12 |
| | dV | 25% | 10,87 |
| O_id1 | dV | 30% | 10 |
| | dV | 35% | 9 |
| | dV | 40% | 8,85 |
| | dV | 45% | 8,35 |
| | dV | 50% | 7,89 |
| | tV | 0 | 37 |
| | tV | 10% | 21 |
| | tV | 15% | 18 |
| | tV | 20% | 17 |
| | tV | 25% | 15,87 |
| O_id1 | tV | 30% | 15 |
| | tV | 35% | 14 |
| | tV | 40% | 13,85 |
| | tV | 45% | 13,35 |
| | tV | 50% | 12,89 |

Figure 5

PROCESS OF DETERMINATION OF A PERCENTAGE OF GLASS SURFACE TO TREAT AND ASSOCIATED MOBILE APPLICATION

CROSS REFERENCE TO RELATED APPLICATIONS

This application is a National Stage entry under 35 U.S.C. § 371 of PCT/EP2021/078577 filed Oct. 15, 2021, and claims priority to European Patent Application No. 20202380.0, filed on Oct. 16, 2020. The contents of each of these applications are incorporated herein by reference in their entirety.

TECHNICAL FIELD

The invention relates to the field of electromagnetic waves reception and/or transmission improvement in an enclosed space, such as a building, a train, a car, a boat . . . .

More precisely, the invention deals with a process of determination of a percentage of glass surface to treat, in a defined enclosed space, in order to reach a predetermined level of electromagnetic reception and/or transmission. Such treatment of glass surface can be an application of a film, a matching layer or like on the glass surface, an application of a glass panel, an adaptation of the structure of the glass, such as thickness, composition, . . . and/or a decoating process. Such treatment may be performed on site or in a factory beforehand or afterwards.

Advantageously, the invention allows the user to foresee the possible network reception and/or transmission improvement he can hope to obtain before engaging in any construction, transformations or renovation works.

BACKGROUND ART

Depending on the position of a building compared to other building and to the position of the internet service provider's antennas, the level of electromagnetic reception and/or transmission can substantially vary from one building to another, from one room to another or even from one position in the room to another. In the same manner, the position of a Wi-Fi router can lead to a bad reception and/or transmission in some areas of the building.

The bad level of reception and/or transmission is often due to the presence of glass surfaces in the building combined with the high attenuation façade. For instance, glass is commonly used, either for windows or to separate rooms inside the building. However, some types of glass contain a metallic layer that acts as a Faraday cage to prevent electromagnetic waves from entering or leaving the room, thus leading to a bad reception and/or transmission.

There are different solutions, proposed by the Applicant, which can improve the electromagnetic level of reception and/or transmission.

Such solution in order to reach a predetermined level of electromagnetic reception and/or transmission can be an application of a film, a matching layer or like on the glass surface, an application of a glass panel, an adaptation of the structure of the glass, such as thickness, composition, . . . and/or a decoating process. The treatment may be performed on site or in a factory beforehand or afterwards.

The first solution, with a decoating process, consists in installing or changing a portion of glass surface to "wavethrough glass" that is almost transparent to radio signals (from 350 MHz to 70 GHz) and can significantly enhance the inside to outside and/or outside to inside communication in buildings while maintaining good thermal insulation properties, such as WaveThru™ solutions sold by the Applicant.

The second solution, with a decoating process, consists in decoating a small portion of a metallic layer covering a glass surface. The metallic layer can either be a very thin metallic layer that is applied on the surface of a glass panel composing a multi-glazed glass surface or a metallic mesh placed in front of the glass surface in order to lower the sun exposition.

To decoat thin metallic layers, a decoating apparatus from the document WO 2015/050762 can be used. The decoating apparatus comprises a laser light source and a lens array configured to focus said laser light source on the metallic layer of a window to decoat. Such apparatus is mounted on suction pads to secure it on the window. This type of apparatus also comprise two motors configured to move the laser along rails along the X and Y axis. The laser is then capable of scribing a grid shape on the metallic layer to improve the electromagnetic reception and/or transmission of the window.

However, installing, changing or decoating glass surfaces is expensive and requires a lot of time during which the enclosed space can't be used properly. Moreover, it is difficult to foresee the impact of installing, changing or decoating glass surfaces on the level of electromagnetic reception and/or transmission because it depends on many different parameters.

Therefore, the technical issue to be solved is how to identify the optimal percentage of glass surface to treat in a defined enclosed space in order to reach a predetermined level of electromagnetic reception and/or transmission.

DISCLOSURE OF THE INVENTION

To solve this technical problem, the invention proposes a process to accurately foresee the effect of treating a glass surface on the level of electromagnetic reception and/or transmission. More precisely, the process proposes to calculate the attenuation level that an exterior partition should generate in order to obtain a sought level of reception and/or transmission. In other words, the process determines a percentage of the exterior partition surface to treat in order to obtain the sought level of reception and/or transmission. To this end, a database containing at least one table or curve of the percentage of treated glass surface as a function of the attenuation level is used.

It is understood the predetermined level of electromagnetic reception and/or transmission is the RSSi for 3G, 4G and/or 5G, and/or RSCP for 3G signal, RSRP for 4G, ss-RSRP for 5G signal and/or the signal quality, such as Ec/No for 3G signal, RSRQ for 4G and ss-RSRQ for 5G signals.

The treatment that follows can be:
- changing a percentage of glass surface to wavethrough glass panels in the enclosed space, i.e. replacing an installed glass surface with a glass surface decoated in a factory;
- installing a percentage of a specific type of glass surface in an enclosed space that does not have any glass surface installed yet, i.e. using a glass surface decoated in a factory; and/or
- decoating in situ a percentage of glass surface in the enclosed space.

In other words, according to a first aspect, the invention relates to a process of determination of a percentage of glass surface to treat with a decoating process, such decoating process may be performed on site or in a factory, in a defined enclosed space in order to reach a predetermined level of electromagnetic reception and/or transmission at a predetermined frequency, using a database;

said defined enclosed space comprising an exterior partition of a total surface;

said database comprising reference attenuation levels measured at said predetermined frequency for different reference percentage of treated surface;

said process comprising the following steps:

measurement of the inside and/or outside electromagnetic signal amplitude at said predetermined frequency in at least one location inside and/or outside of said defined enclosed space;

calculation of an expected attenuation level as a function of the inside and/or outside electromagnetic signal amplitude and of said predetermined level of electromagnetic reception and/or transmission, inside said enclosed space, at said predetermined frequency;

identification, in said database, of reference percentages of treated surface where the corresponding reference attenuation levels are inferior or equal to said expected attenuation level; and determination of a percentage of glass surface to treat in said defined enclosed space corresponding to the identified reference percentage of treated surface where the corresponding reference attenuation level is minimum meaning that this step determines the minimum percentage of glass surface that leads the minimum acceptable attenuation level.

According to the invention, an "exterior partition" corresponds to the limits of said enclosed that separate the inside from the outside of an enclosed space. An exterior partition can either be real or virtual and comprises at least a wall. For instance, especially for IoT communications, if the enclosed space is a room in a building, the "exterior partition" of this room corresponds to the walls of the room, including the one(s) that open to the exterior of the building and the one(s) that open to other enclosed spaces such as rooms, stairwells . . . . An exterior partition may be composed of several materials such as wood or metal and may include glass.

The attenuation levels can be understood as:

the attenuation of an electromagnetic wave coming from outside to inside of the enclosed space, which corresponds, for instance, to the attenuation of radio frequencies coming from an internet provider antenna; or the attenuation of an electromagnetic wave coming from inside to outside of the enclosed space, which corresponds, for instance, to the attenuation of a radio signal outside of a room such as Wi-Fi signal outside of a room containing a Wi-Fi router.

Independently from how the attenuation level is measured, the absolute value of the attenuation level is used for comparison with other attenuation levels stored in the database.

Thus, the invention allows to find the optimal percentage of glass surface to treat in a defined enclosed space in order to reach a predetermined level of electromagnetic reception and/or transmission.

Advantageously, the percentage of glass surface to treat and the reference percentage of treated surface are calculated by normalizing the surface by the total surface of the exterior partition.

Normalized values are better for comparison. Indeed, the database may contain many different types of reference enclosed spaces where the dimensions and shapes of the exterior partitions vary a lot. As long as the ratio between the glass surface and the total surface of the exterior partition is similar, a relevant comparison is possible.

In an embodiment of the invention, said defined enclosed space comprising an exterior partition of a total glass surface inferior or equal to said total surface, after the step of determination, said process checks if said determined percentage of glass surface to treat is inferior to a maximum percentage value, said maximum percentage value corresponding to the total glass surface divided by the total surface.

In other words, this feature indicates to the user if the glass surface that is already present in the considered exterior partition is sufficient to obtain a sought level of reception and/or transmission. If the determined percentage of glass surface to treat is inferior to the maximum percentage value, it means that the preexisting glass surface is enough to obtain the sought level of reception and/or transmission. Thus, the renovation or construction work can be executed.

However, if the determined percentage of glass surface to treat is superior to the maximum percentage value, then the preexisting glass surface is not enough to obtain the sought level of reception and/or transmission. Thus, the blueprints of the enclosed space must be modified in order to open new free spaces for new glass panels. This feature is a good way to estimate the costs of the work.

In another embodiment of the invention:

said defined enclosed space comprises an exterior partition with a type of glass;

said database comprises reference enclosed space, with an exterior partition of a type of glass, where reference attenuation levels were measured at said predetermined frequency for different reference percentages of treated surface; and the identification step, in said database, further comprises a selection of a reference enclosed space with the same type of glass as said reference enclosed space type of glass.

In this embodiment, the database contains several tables or curves of the percentages of treated glass surface as a function of the attenuation level measured. Each table or curve corresponds to different geometries of enclosed spaces with a specific type of glass. This embodiment allows to choose the closest reference enclosed space and to minimize the error rate.

In another embodiment of the invention, the process further includes the following steps:

measurement of the outside electromagnetic signal amplitude at said predetermined frequency in at least one location outside of said defined enclosed space;

measurement of the inside electromagnetic signal amplitude at said predetermined frequency in at least one location inside said defined enclosed space;

determination of an initial attenuation level using the difference between said inside electromagnetic signal amplitude and said outside electromagnetic signal amplitude, at said predetermined frequency; and calculation of an expected gain equal to the difference between the reference attenuation level of said identified reference percentage of treated surface and said initial attenuation level.

In particular, this embodiment measures the initial attenuation level as a base reference before any work is done.

Preferably, if the outside electromagnetic signal is lower than −100 dBm for a 4G signal, the client should know that no work can be done to significantly improve the inside level of reception and/or transmission because the signal received by the building is already too low.

In order to further improve the quality of the process and reduce the error rate, multiple measurements of the inside and outside electromagnetic signals can be made. In this embodiment, said defined enclosed space comprises multiple outside measurement locations, said initial attenuation level being determined between an inside measurement location and the closest outside measurement location.

Similarly, said defined enclosed space can also comprise multiple indoor measure locations, said initial attenuation level being determined by averaging the attenuation levels calculated for the multiple indoor measure locations.

Moreover, said measurement of the outside electromagnetic signal amplitude can be realized inside said enclosed space at a distance inferior to 1 m from an opening of the exterior partition.

According to the invention, an opening can either be a window opening, a door opening or any opening that allows access between the inside and the outside of the enclosed space.

In another embodiment, the process further comprises the following steps:

treating said percentage of glass surface to treat in said defined enclosed space;

second measurement, after the treatment, of the inside and/or outside electromagnetic signal amplitude at said predetermined frequency in said at least one location inside and/or outside of said defined enclosed space;

determination of a final attenuation level using the ratio between said indoor electromagnetic signal amplitude and said outdoor electromagnetic signal amplitude, at said predetermined frequency; and calculation of a real gain equal to the difference between said final attenuation level and said initial attenuation level.

Optionally, said process further comprises a step of calculation of the difference between the expected gain and the real gain.

This initial attenuation level and the final attenuation level are compared in order to estimate the reception and/or transmission improvement. This is a good indicator to show with numbers how much the reception and/or transmission has progressed. This indicator is completed with a comparison of the expected gain and the real gain in order to estimate the reliability of the process in predicting the reception and/or transmission improvement.

After running the process, the database can be completed with the determined initial attenuation level and the final attenuation level calculated after treatment. This feature allows to get more and more references and to lower the error rate as the database is completed.

According to the type of treatment, the process can be adapted. Hence, when the process concerns a determination of a percentage of glass surface to decoat, the process comprises the following steps:

retrieving the decoating apparatus configurations;

identification of the areas of the glass surface in said defined enclosed space that can be decoated by the apparatus; and determination of the surface to decoat by taking into account the identified areas and the percentage of glass surface to decoat.

When the process concerns a determination of a percentage of glass surface to replace, the process comprises the following steps:

identification of the windows geometry in said defined enclosed space; and determination, in the possible combinations of windows to replace, of the window or combination of windows to replace wherein the corresponding percentage of glass surface is superior and the closest to the determined percentage of glass surface to replace.

When the process concerns a determination of a percentage of glass surface to install, the process comprises the following steps:

identification, on the enclosed space blueprints, of the windows geometry;

determination, in the possible combinations of windows to install, of the window or combination of windows to install wherein the corresponding percentage of glass surface is superior and the closest to the determined percentage of glass surface to install.

According to a second aspect, the invention also relates to an application configured to run the process according to the first aspect.

Using the mobile application, the measurement steps can be realized using the network of the telecom operator to test the range of predetermined frequency corresponding to said operator, according to a third aspect.

Moreover, said mobile application can be shared between several smartphones or tablets, each using the network of a different operator. Or, said mobile application can be used by a device capable of testing several operator networks.

It is noted that the invention relates to all possible combinations of features recited in the claims or in the described embodiments.

The following description relates to building applications but it's understood that the invention may be applicable to others fields like automotive or transportation applications.

BRIEF DESCRIPTION OF DRAWINGS/FIGURES

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

The different aspects of the present invention will now be described in more details, with reference to the appended drawings showing various exemplifying embodiments of the invention, which are provided by way of illustration and not of limitation. The drawings are a schematic representation and not true to scale. The drawings do not restrict the invention in any way. More advantages will be explained with examples.

FIG. 2 is a table presenting the information contained in the database of the embodiment from FIG. 1.

FIG. 5 is a table presenting the information contained in the database of the embodiment from FIG. 4.

DETAILED DESCRIPTION

Figure 1:
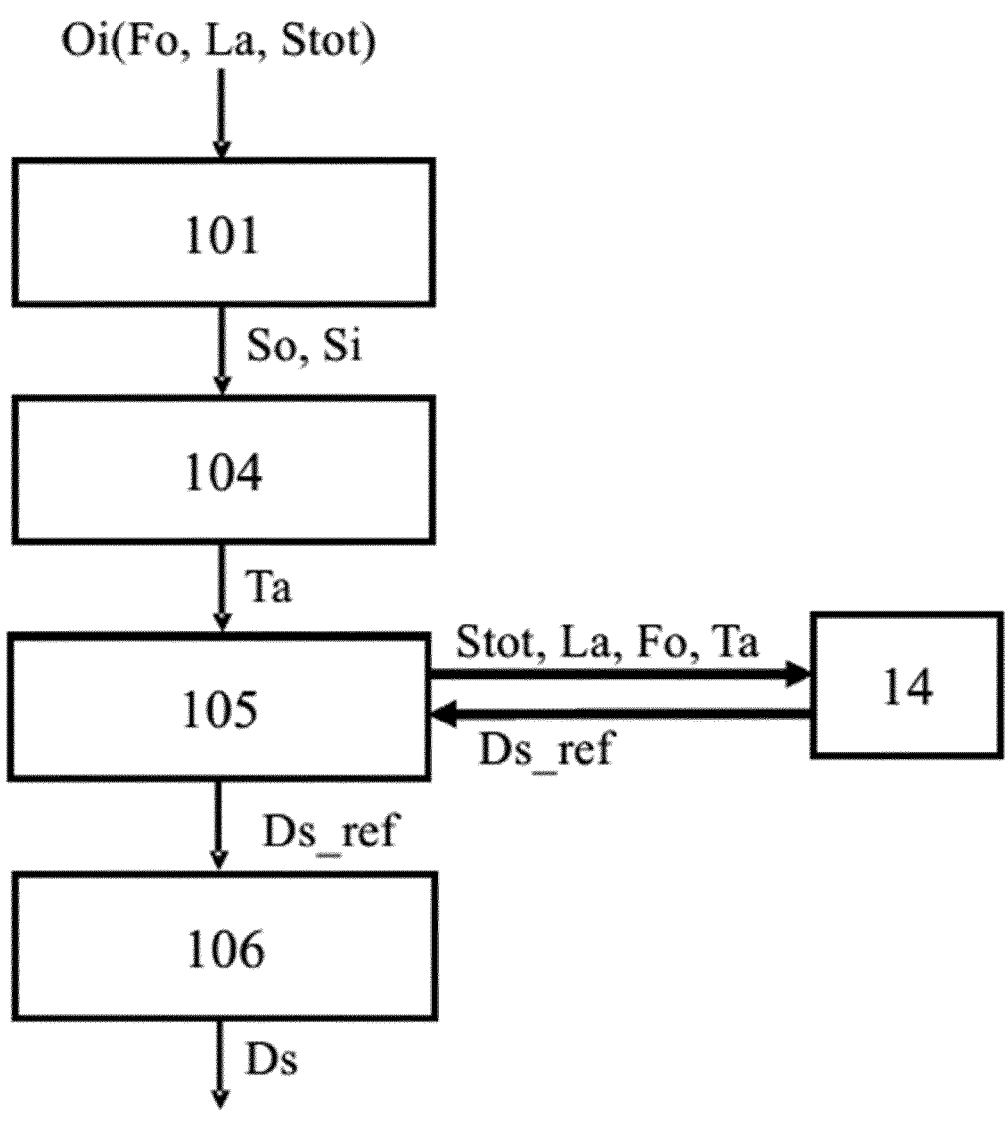
FIG. 1 is a block diagram of the process according to a first embodiment of the invention.

For a better understanding, the scale of each component in the drawing might be different from the actual scale. FIG. 1 is a block diagram presenting the main steps of the process according to a first embodiment of the invention. The process is hosted by an application that the user can install on his phone or tablet. However, a dedicated device can also be used.

Before using the process, a user must define several parameters.

The first parameter to define is an enclosed space Oi where the process shall be conducted. An enclosed space Oi can either be a room in a building, a wagon from a train, a patio or a terrace. Generally this enclosed space Oi is identified because the inside level of reception and/or transmission La is mediocre or, in the case of a construction project, because this specific enclosed space requires a good level of reception and/or transmission La. For instance, the cafeteria or the break room in a building needs a good level of reception and/or transmission La because many people simultaneously use their phones to telephone or browse the internet using a wireless network. The enclosed space Oi can also be identified because it contains a Wi-Fi router that is supposed to also feed the adjoining rooms but the level of reception and/or transmission La in these adjoining rooms is low.

The defined enclosed space Oi is delimited by an exterior partition of a total surface Stot. This exterior partition is either real or virtual. In both cases, the exterior partition allows to differentiate the inside from the outside of the enclosed space Oi. In general, the exterior partition comprises at least a wall partially or totally made of glass and comprising some metal. The metal acts as a faraday cage and blocks out any electromagnetic reception and/or transmission. The total surface Stot of the exterior partition can be measured manually by the user or it can be estimated on the blueprint of the exterior partition.

Before using the process, a user must also define the frequency range Fo whose reception and/or transmission needs to be improved. For instance, if the issue comes from the Wi-Fi network, the frequency range Fo that must be considered is the 2.45 GHz and 5 GHz range. If the issue comes from the 4G reception and/or transmission of a specific network provider, then the frequency range Fo that must be considered is the one that is allocated to this specific network provider. It is obviously possible to test several frequency ranges Fo, but the entire process must be successively or simultaneously run for each defined frequency range Fo.

Finally, the user must also define a predetermined level of electromagnetic reception and/or transmission La corresponding to the level of reception and/or transmission that the user expects at least to reach after treatment inside the enclosed space Oi.

The first step 101 of the process is to measure the inside and/or outside electromagnetic signal So, Si for the predetermined frequency range Fo.

The inside electromagnetic signal Si measurement is realized inside the enclosed space Oi, in front of an opening (door or window for instance), when said opening is closed.

The outside signal So can either be measured outside of the enclosed space Oi or inside the enclosed space Oi, in front of the opening when said opening is open. The measurements are preferably realized in several locations and averaged.

The measurement is carried out with a device equipped with at least an antenna in order to receive the frequency range Fo identified by the user. In the case of a phone or tablet, the sim-card or the e-card of the phone is tuned to the frequency range Fo of a specific network operator. Thus, the user will require as many phones/tablet and associated sim-card/e-card as there are operator frequency ranges Fo to test. A dedicated device including several antennas can also be used in order to successively or simultaneously test several frequency ranges.

The second step 104 of the process is to calculate the expected attenuation level Ta, which corresponds to the attenuation that the exterior partition should have in order to reach the predetermined level of electromagnetic reception and/or transmission La.

The expected attenuation level Ta is calculated as a function of the predetermined level of electromagnetic reception and/or transmission La and of the inside and/or outside electromagnetic signal Si, So measurement.

For instance, using only the outside electromagnetic signal So, if the outside electromagnetic signal So is equal to −95 dBm and the expected level of electromagnetic reception and/or transmission La is equal to −110 dBm. Thus, the expected attenuation level Ta is calculated by taking the difference between the predetermined level of electromagnetic reception and/or transmission La value and the outside electromagnetic signal So value: −95−(−110)=15 dB.

It is also possible to use only the inside electromagnetic signal Si knowing the initial attenuation level of the total glass surface Sgtot. If the inside electromagnetic signal Si is equal to −130 dBm and the predetermined level of electromagnetic reception and/or transmission La is equal to −110 dBm, an improvement of the inside electromagnetic signal Si of 20 dB is expected by modifying the glass surface.

Back to FIG. 1, the third step 105 of the process is to identify, in the database 14, the reference percentages of treated surface Ds_ref where the corresponding reference attenuation levels T_ref are inferior or equal to said expected attenuation level Ta.

Figure 3:
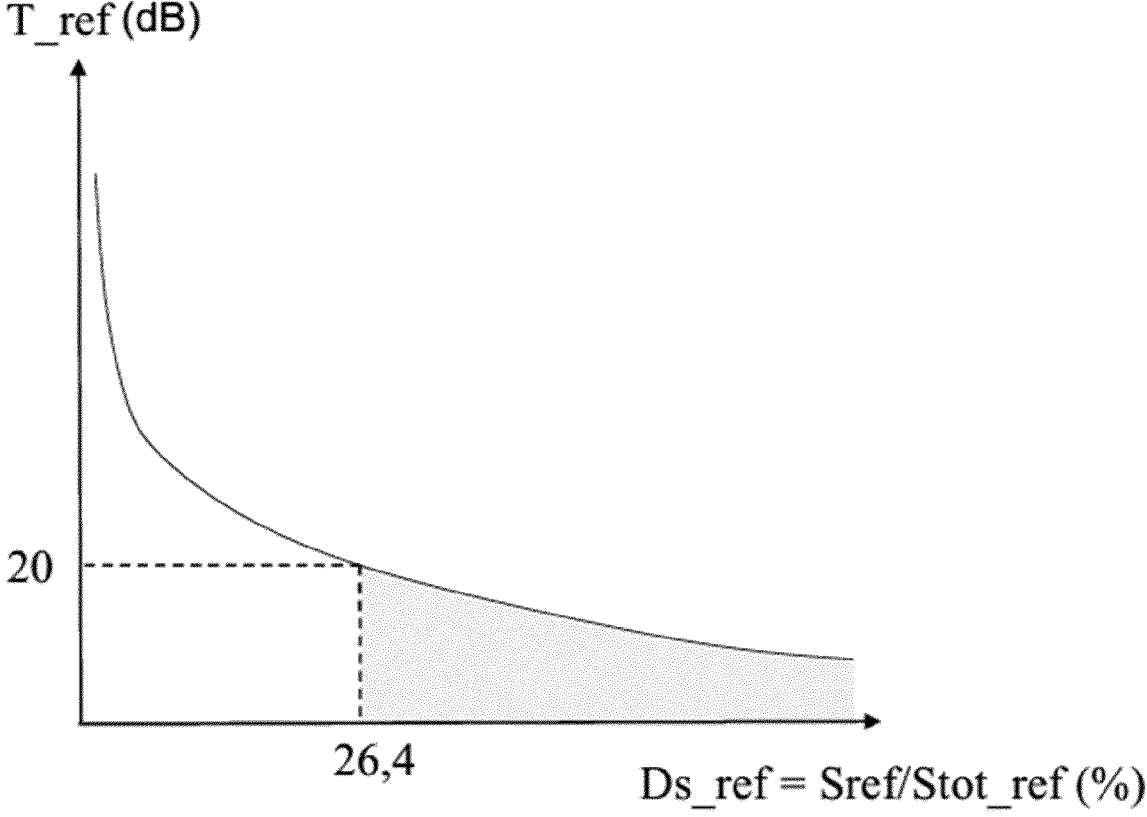
FIG. 3 is a curve of the attenuation as a function of the reference surface ratio of treated glass surface, which is another representation of the information contained in the database of the embodiment from FIG. 1.

FIGS. 2 and 3 show an example of what can be contained in database 14. Indeed, database 14 contains either reference tables or curves of the percentage of reference treated glass surface Ds_ref as a function of the reference attenuation level T_ref for a predetermined frequency range Fo. In this embodiment, the table or curve is generic and can be applied to all new enclosed spaces Oi whose attenuation level Ta needs to be estimated.

More specifically, FIG. 2 illustrates a table with a first column containing reference treated glass surface Ds_ref expressed in percentage of the total surface Stot_ref of the reference enclosed space. Thus, the reference treated glass surface Ds_ref is equal to the reference treated surface Sref divided by the total surface Stot_ref of the reference enclosed space. The second column of the table contains reference attenuation level T_ref also expressed in percentages.

FIG. 2 illustrates a curve with an hyperbolic shape. The y-axis represents the reference attenuation level T_ref expressed in dB and the x-axis represents the reference treated glass surface Ds_ref expressed in percentages and calculated like above-mentioned.

If the table from FIG. 2 is used to determine the percentage of reference treated glass surface Ds_ref, the expected attenuation level Ta can be equal to 7 dB as calculated above. The rows highlighted in light grey are the one selected by the process during the third step 105. They correspond to the rows where the attenuation level T_ref is inferior or equal to 7 dB.

If the table from FIG. 3 is used to determine the percentage of treated glass surface Ds_ref, the expected attenuation level Ta can be equal to 20 dB as calculated above. The process selects the portion of the curve highlighted in light grey during the third step 105. The selected values correspond to the values where the attenuation level T_ref is inferior or equal to 20 dB.

Back again to FIG. 1, the fourth step 106 consists in determining the reference percentage of glass surface to treat Ds_ref among the selected rows/values corresponding to the maximum reference attenuation level T_ref. This reference percentage of glass surface to treat Ds_ref will be the percentage of glass surface to treat Ds in the enclosed space Oi.

In the table from FIG. 2, the row where the identified reference attenuation level T_ref is maximum is highlighted in dark grey. This row shows that to obtain a reference attenuation level T_ref of 23 dB, a reference percentage of glass surface to treat Ds_ref of at least 40% needs to be treated. Thus, in order to get an expected attenuation level Ta equal or below 23 dB in the considered enclosed space Oi, a percentage of glass surface Ds of at least 40% needs to be treated.

In the curve from FIG. 3, the value Ds where the identified reference attenuation level T_ref is maximum is highlighted with a dotted line. In order to obtain a reference attenuation level T_ref of 20 dBm, a reference percentage of glass surface to treat Ds_ref of 26.4% needs to be treated. Thus, in order to get an expected attenuation level Ta equal or below 20 dB in the considered enclosed space Oi, a percentage of glass surface Ds of 26.4% needs to be treated. This representation presents the advantage of having an infinite number of solutions because the curve is continuous.

Figure 4:
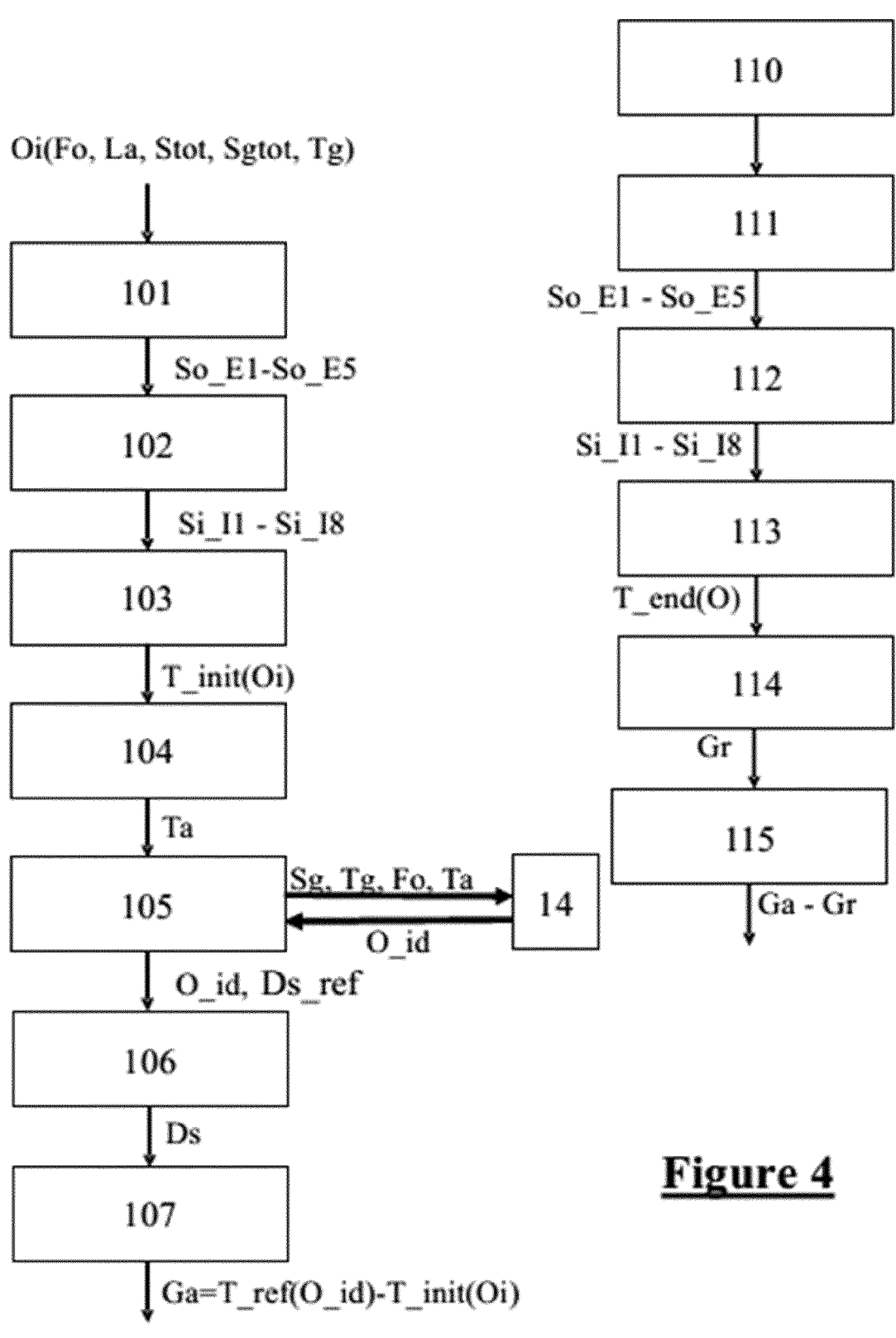
FIG. 4 is a block diagram of the process according to a second embodiment of the invention.

A more complete process is presented on FIG. 4. As stated previously, the user must determine beforehand an enclosed space Oi, the level of reception and/or transmission La he needs inside this enclosed space Oi, the total surface Stot of the exterior partition of this enclosed space. In this embodiment, the user also needs to determine the total glass surface Sgtot of the exterior partition and the type of glass Tg used. These two information can either be measured or determined by the user himself, or they can be found on the enclosed space Oi blueprints.

The first steps 101, 102, 103 of the process consist in obtaining the initial attenuation level T_init. This value is a good indicator of the state of the enclosed space Oi before any treatment.

In the case of an already constructed enclosed space Oi, the easiest way to obtain the initial attenuation level T_init is to measure 101 the outside electromagnetic signal So and measure 102 the inside electromagnetic signal Si and to subtract 103 the two values to obtain the initial attenuation level T_init.

Figure 6:
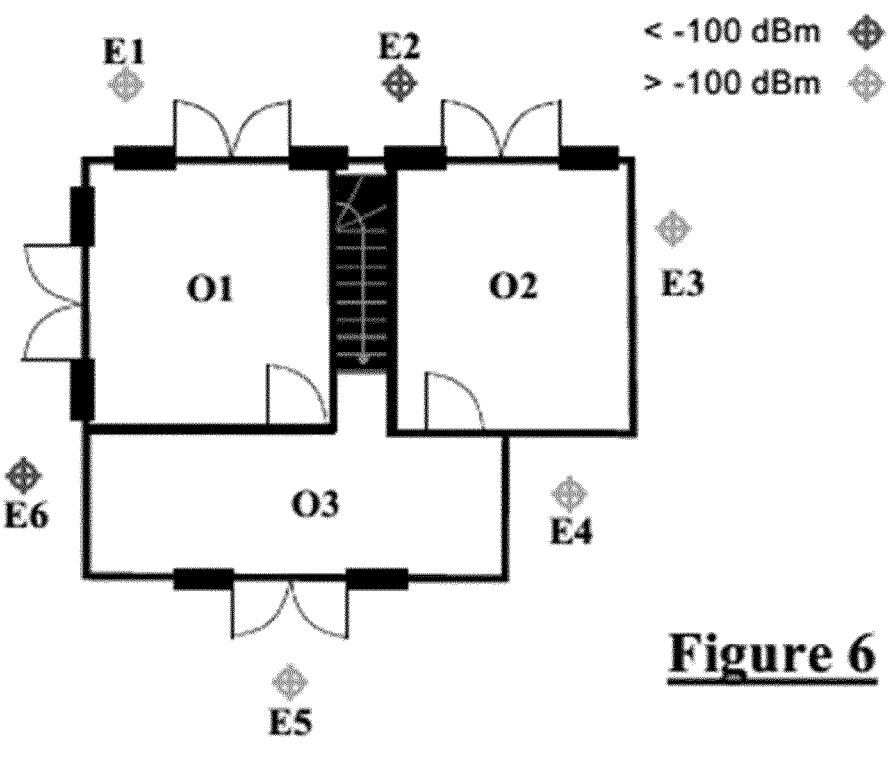
FIG. 6 is schematic representation of a building floor outside electromagnetic signal amplitude measurement.
Figure 7:
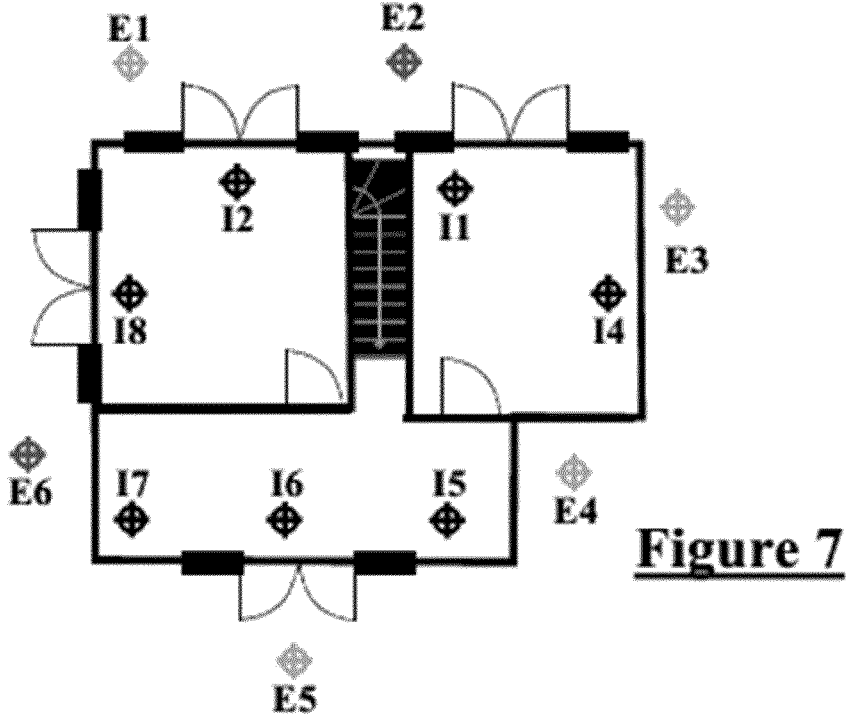
FIG. 7 is schematic representation of a building floor inside and outside electromagnetic signal amplitude measurement.
Figure 8:
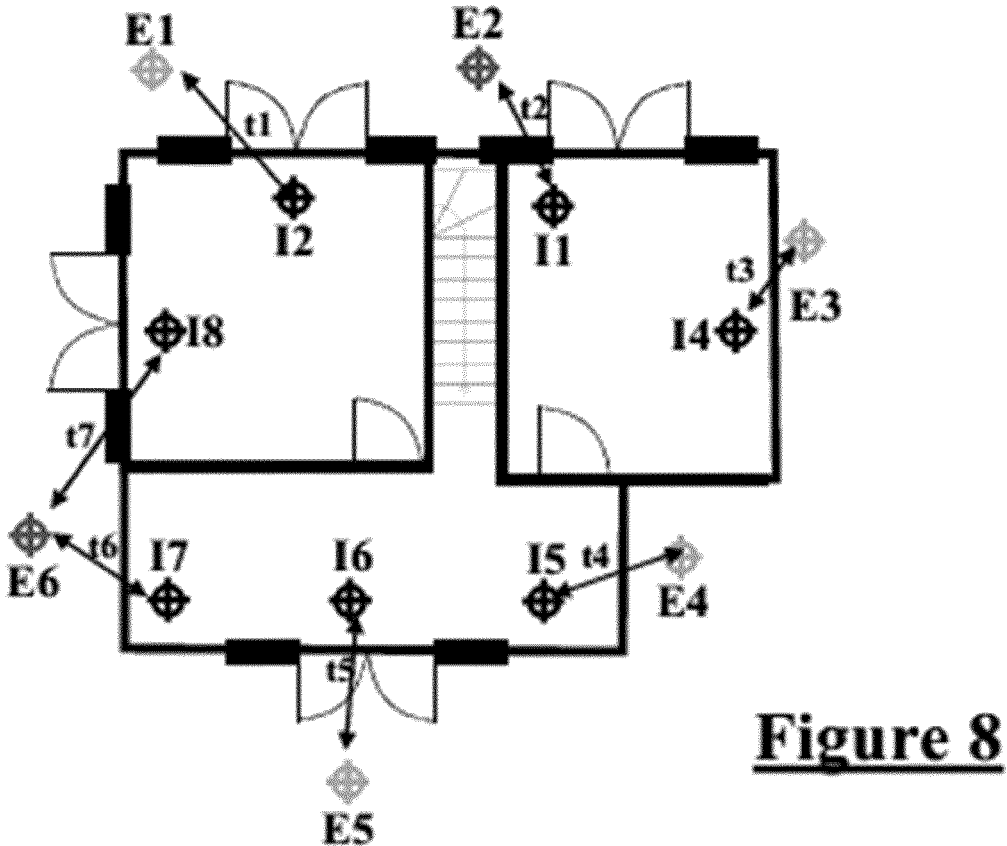
FIG. 8 is schematic representation of a building floor attenuation levels calculation.

Both measurements can also be realized inside the enclosed space Oi, in front of the opening (door or window for instance). In that case, the outside signal So can be measured when the door/window is open and the inside signal Si can be measured when the door/window is closed. The measurements are preferably realized in several locations E1-E6, I1-I8. FIGS. 6 to 8 show an example of realization of steps 101 to 103.

In this example, the process is applied on the whole floor of a building containing three mains rooms O1-O3. All rooms O1-O3 need to be tested in order to estimate the attenuation of the building façade for a predetermined range of frequency Fo. In FIG. 6, the outside electromagnetic signal So is measured in six different emplacements E1-E6 by circling around the building. A first estimation of the outside electromagnetic signal So is made by distinguishing the emplacements E2, E6 where the outside electromagnetic signal So level is below −100 dBm from the emplacements E1, E3, E4, E5 where the outside electromagnetic signal So level is over −100 dBm.

If most of the outside electromagnetic signal So measurements are below −100 dBm, the Applicant doesn't recommend to engage in any construction, transformation or renovation work because the outside electromagnetic signal So is already too low to get a good level of reception and/or transmission.

In FIG. 7, the inside electromagnetic signal Si is measured in eight different emplacements I1-I8 by circling around the rooms O1-O3.

Several attenuation levels t1-t7 are calculated by subtracting the inside electromagnetic signal Si and the outside electromagnetic signal So of the two closest outside and inside emplacements E1-E6, I1-I8. For instance, as shown in FIG. 8, attenuation level t3 is equal to the outside electromagnetic signal So measured in emplacement E3 minus the inside electromagnetic signal Si measured in emplacement I4.

After this step, several attenuation levels t1-t7 can correspond to the same room O1-O3. For instance, t2 and t3 both correspond to room O2. In that case, the initial attenuation level T_init of room O2 is obtained by averaging these two values.

However, sometimes, it is impossible to measure the outside signal So, because the window cannot be opened for instance. In that case, the initial attenuation level T_init needs to be estimated using the data from database 14. Similarly, in the case of an enclosed space that has not yet been constructed, it is impossible to measure the inside electromagnetic signal Si. Thus, the initial attenuation level T_init also needs to be estimated using the data from database 14.

In order to find the initial attenuation level T_init, the user can read the table or curve from FIGS. 2, 3 and 5 and look for a reference percentage of treated glass surface Ds_ref equal to 0%. A corresponding attenuation level T_ref can be read on the table/curve. This attenuation level T_ref is the initial attenuation level T_init. These steps can obviously be automated in the process.

Step 104 is carried out the same way as described for FIG. 3. However, step 105 is different as it relies on a more complete database 14, that is represented on FIG. 5. This database is filled with sub-tables containing data on the percentage of treated glass surface as a function of the attenuation level for a predetermined frequency range Fo, for different reference enclosed spaces O_id1, O_id2. These reference enclosed spaces O_id1, O_id2 differ by the type of glass Tg_ref used for the glass surface. For instance, the glass surface can either be a simple, double dV or triple tV glazed glass surface.

Thus, step 105 requires to first identify the reference enclosed spaces O_id1, O_id2 with the closest type of glass to the enclosed space Oi to treat. Once this reference enclosed spaces O_id1, O_id2 identified, the reference glass surfaces to treat Ds_ref can be selected 105 as previously stated and the glass surface to treat Ds can also be found 106 the same way.

The process from FIG. 4 is completed by a step 107 of determination of an expected gain Ga corresponding to the difference between the reference attenuation level T_ref identified in step 105 and the initial attenuation level T_init. The treatment of the surface to treat Ds is then carried out in step 110.

Afterwards, in order to control the quality of the process, steps 111, 112 and 113 consist in measuring or estimating again the inside and/or outside signal So, Si and calculating the final attenuation level T_end. The process is completed by a step 114 of determination of a real gain Gr corresponding to the difference between the final attenuation level T_end identified in step 113 and the initial attenuation level T_init identified in step 103. By comparing both gains Ga and Gr, the user can appreciate how well the process predicted the reception and/or transmission in the enclosed space Oi.

Moreover, both attenuation level can be stored in the database 14.

To conclude, the invention discloses a process capable of identifying the optimal percentage of glass surface to treat in a defined enclosed space in order to reach a predetermined level of electromagnetic reception and/or transmission.

The invention claimed is:

1. A process of determination of a percentage of a glass surface to treat, such treatment performed in a defined enclosed space in order to reach a predetermined level of electromagnetic reception and/or transmission at a predetermined frequency, using a database stored in a memory;

said defined enclosed space comprising an exterior partition of a total surface;

said database comprising reference attenuation levels measured at said predetermined frequency for different reference percentages of a treated surface;

said process comprising:

measuring, with an antenna, of an inside and/or outside electromagnetic signal amplitude at said predetermined frequency in at least one location of an inside and/or outside of said defined enclosed space;

calculating, with a processing circuitry, of an expected attenuation level as a function of the inside and/or outside electromagnetic signal amplitude and of said predetermined level of electromagnetic reception and/or transmission, inside said defined enclosed space, at said predetermined frequency;

identifying, with the processing circuitry, in said database, of a reference percentage of treated surface where corresponding reference attenuation levels are inferior or equal to said expected attenuation level; and determining, with the processing circuitry, of a percentage of glass surface to treat in said defined enclosed space corresponding to the identified reference percentage of treated surface where the corresponding reference attenuation level is at a minimum.

2. The process of determination according to claim 1, wherein the percentage of glass surface to treat and the reference percentage of the treated surface are calculated by normalizing a surface by the total surface of the exterior partition.

3. The process of determination according to claim 1, wherein, said defined enclosed space comprising an exterior partition of a total glass surface inferior or equal to said total surface, after the determining, said process checks if said determined percentage of glass surface to treat is inferior to a maximum percentage value, said maximum percentage value corresponding to the total glass surface divided by the total surface.

4. The process of determination according to claim 1, wherein:

said defined enclosed space comprises an exterior partition with a type of glass; and said database comprises a reference enclosed space, with an exterior partition of a type of glass, where reference attenuation levels were measured at said predetermined frequency for different reference percentages of treated surface; and the identifying, in said database, further comprises a selection of a reference enclosed space with the same type of glass as said reference enclosed space type of glass.

5. The process of determination according to claim 1, wherein said process further comprises:

measuring of the outside electromagnetic signal amplitude at said predetermined frequency in at least one location outside of said defined enclosed space;

measuring the inside electromagnetic signal amplitude at said predetermined frequency in at least one location inside said defined enclosed space;

determining an initial attenuation level using a difference between said inside electromagnetic signal amplitude and said outside electromagnetic signal amplitude, at said predetermined frequency; and calculating an expected gain (Ga) equal to a difference between the reference attenuation level of said identified reference percentage of treated surface and said initial attenuation level.

6. The process of determination according to claim 5, wherein said defined enclosed space comprises multiple outside measurement locations, said initial attenuation level being determined between an inside measurement location and a closest outside measurement location.

7. The process of determination according to claim 5, wherein said defined enclosed space comprises multiple indoor measure locations, said initial attenuation level being determined by averaging the attenuation levels calculated for the multiple indoor measure locations.

8. The process of determination according to claim 5, wherein said process further comprises:

treating said percentage of glass surface to treat in said defined enclosed space;

measuring, after the treatment, of the inside and/or outside electromagnetic signal amplitude at said predetermined frequency in said at least one location inside and/or outside of said defined enclosed space;

determining a final attenuation level using said inside and/or outside electromagnetic signal amplitude at said predetermined frequency; and calculating a real gain equal to a difference between said final attenuation level and said initial attenuation level.

9. The process of determination according to claim 8, further comprising calculating the difference between the expected gain and the real gain.

10. The process of determination according to claim 8, wherein said database is completed with the determined initial attenuation level and the final attenuation level calculated after treatment.

11. The process of determination according to claim 9, wherein said measurement of the outside electromagnetic signal amplitude is realized inside said enclosed space at a distance inferior to 1 m from an opening of the exterior partition.

12. A mobile application configured to run the process according to claim 1.

13. The mobile application according to claim 12, wherein the measuring of the inside and/or outside electromagnetic signal amplitudes are realized using a network of a telecom operator to test a range of predetermined frequency corresponding to said telecom operator.

14. The mobile application according to claim 12, wherein said mobile application is shared between several smartphones or tablets, each using the network of a different operator.

15. The mobile application according to claim 14, wherein said mobile application is used by a device capable of testing several operator networks.

16. A process for treating a glass surface, such treatment being performed in a defined enclosed space in order to reach a predetermined level of electromagnetic reception and/or transmission at a predetermined frequency, using a database stored in a memory;

said defined enclosed space comprising an exterior partition of a total surface;

said database comprising reference attenuation levels measured at said predetermined frequency for different reference percentages of a treated surface;

said process comprising:

measuring, with an antenna, of an inside and/or outside electromagnetic signal amplitude at said predetermined frequency in at least one location of an inside and/or outside of said defined enclosed space;

calculating, with a processing circuitry, of an expected attenuation level as a function of the inside and/or outside electromagnetic signal amplitude and of said predetermined level of electromagnetic reception and/or transmission, inside said defined enclosed space, at said predetermined frequency;

identifying, in said database, of a reference percentage of treated surface where corresponding reference attenuation levels are inferior or equal to said expected attenuation level; and determining, with the processing circuity, of a percentage of glass surface to treat in said defined enclosed space corresponding to the identified reference percentage of treated surface where the corresponding reference attenuation level is at a minimum, treating the determined percentage of the glass surface.

* * * * *